April 16, 1963     R. F. MALLINA     3,085,843
COMBINED DESK AND BOOTH
Filed Sept. 16, 1960
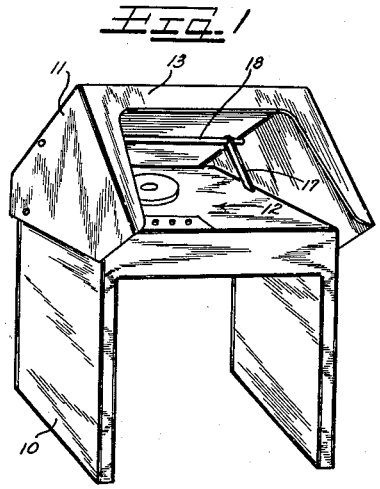
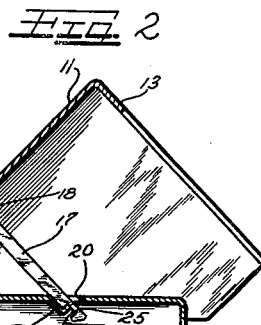
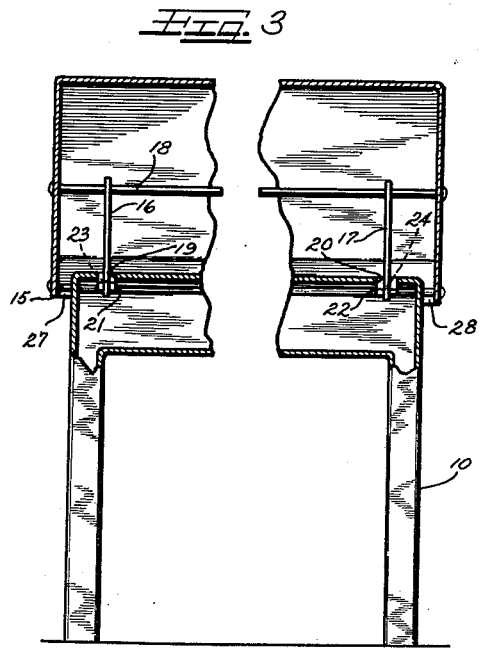
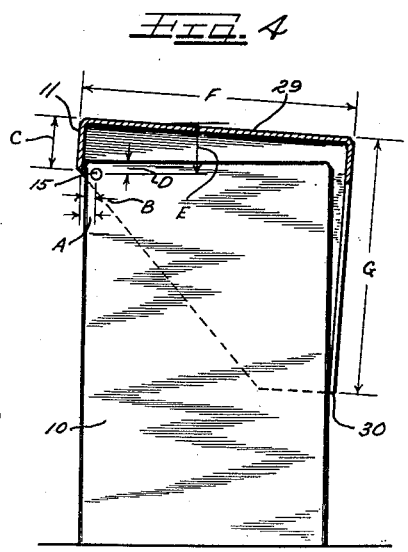
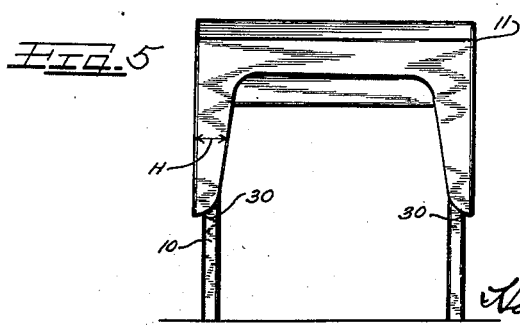
INVENTOR.
RUDOLPH F. MALLINA
BY
ATTORNEYS

United States Patent Office 3,085,843
Patented Apr. 16, 1963

3,085,843
COMBINED DESK AND BOOTH
Rudolph F. Mallina, Hastings on Hudson, N.Y., assignor to Thompson Ramo Wooldridge Inc., Cleveland, Ohio, a corporation of Ohio
Filed Sept. 16, 1960, Ser. No. 56,589
4 Claims. (Cl. 312—239)

This invention relates to classroom desks and, more particularly, to a desk that can be used as either a conventional classroom desk or a practice booth that contains electronic teaching apparatus.

This application is a continuation-in-part of my copending application entitled "Convertible Sound Absorbing Booth," U.S. Serial No. 845,759, filed October 12, 1959, now abandoned.

Electronic teaching aids are being used to teach numerous subjects at a rapidly increasing rate. This is especially true in foreign language classes where magnetic tape recorders are being used to give individual instructions to the students. In the usual foreign language class each student is assigned to an individual booth which is equipped with a magnetic tape recorder, a set of head phones, and a microphone. The student listens to instructions which are prerecorded on a magnetic tape and responds to the instructions by speaking into the microphone. His responses are also recorded on the magnetic tape and the student is then able to play back the tape and listen to both the instructions and his responses and compare the two.

Some difficulty has been encountered because these teaching booths have to be specially constructed to be effective and they are normally in use only a limited time each day. Ordinarily, therefore, such a booth is useless except for this relatively short teaching period. Attempts have been made to construct teaching booths which overcome these difficulties but they have been deficient in that they do not sufficiently isolate each student from the other students in the classroom. Further, unless the booths have been very expensively constructed, some sort of a barrier has been left remaining between the students or between a student and the instructor after the booth has been converted into a normal classroom desk.

It is an object of the present invention to obviate these difficulties by providing a desk which is an effective sound absorbing booth in one position and is a conventional classroom desk in a second position.

It is another object of this invention to provide a booth which is able to dissipate large amounts of acoustic power generated within it and which can accommodate electronic teaching apparatus.

It is still another object of this invention to provide a relatively inexpensive and functional structure which can serve equally well as a conventional classroom desk or a sound absorbing booth.

Other objects, features and advantages of the present invention will be apparent from the following detailed description taken in conjunction with the accompanying figures of the drawings, in which, On the drawings:
FIGURE 1 is a view in perspective of a combined desk and booth constructed in accordance with the invention;
FIGURE 2 is a side view of the combined desk and booth with a portion of the cover broken away;
FIGURE 3 is a front view of the combined desk and booth with a portion of the cover cut away;
FIGURE 4 is a side view of the combined desk and booth with the cover in the closed position; and
FIGURE 5 is a front view of the combined desk and booth with the cover in the closed position.

As shown on the drawings:
The combined desk and booth illustrated in FIGURE 1 includes a table 10 and a hinged cover 11. The top of the table 10 is constructed to receive electronic teaching equipment 12 which may take the form of magnetic tape recorders, magnetic disk recorders, television sets, etc. The cover 11 is hinged on the table 10 and may be rotated between two positions, an open position as illustrated by FIGURE 1 and a closed position as illustrated by FIGURE 4. The front side 13 of the cover 11 is cut away so that, when the cover 11 is in the open position a student sitting at the desk has access to the electronic teaching equipment 12 mounted in the desk and when the cover 11 is in the closed position a student will be able to sit at the desk and use a top 29 of the cover 11 as a conventional desk top.

With reference to FIGURES 2 and 3, the cover 11 is hinged to the table 10 by a shaft 15 which is fastened at each of its ends to the sides of the cover 11 and extends through the table 10. The two support bars 16 and 17 are provided for locking the cover 11 in the open position. These two support bars 16 and 17 are rotatably mounted on a shaft 18 which is fixed to the two sides of the cover 11. The two support bars 16 and 17 extend through two openings 19 and 20, respectively, formed in the top surface of the table 10, and two hooks 21 and 22 formed on the edges of the openings 19 and 20 are adapted to catch on two notches 23 and 24 formed in the support bars 16 and 17, respectively.

When the cover 11 is in the open position as shown in FIGURES 2 and 3, the notches 23 and 24 rest on the hooks 21 and 22 and maintain the cover in the open position. To put the cover 11 in the closed position, the cover is raised slightly with one hand while the other hand pulls one of the support bars 16 and 17 upwardly until the hooks 21 and 22 disengage from the notches 23 and 24. The cover 11 is then lowered to its closed position with the support bars 16 and 17 extending downwardly into the interior of the table 10. It can be seen that this construction is advantageous in that the cover cannot be accidentally dropped on a student's hand. One hand must be used to raise the cover 11 while the other lifts one of the support bars 16 and 17 so that the student will always have a firm grip on the cover 11 when lowering it.

The support bars 16 and 17 also act as limit stops when the cover 11 is being raised. The lower edges 25 of the notches 23 and 24 abut against the lower edges of the hooks 21 and 22 and prevent the cover 11 from being lifted too high. The size of the openings 19 and 20 is made so that a student cannot lift the support bars 16 and 17 upwardly and raise the edges 25 over the top of the hooks 21 and 22, thereby making the mechanism ineffective.

An important feature of a combined desk and booth constructed in accordance with this invention is its ability to dissipate acoustic power generated within the interior of the cover 11. This feature is very important because it presents the recitation by one student from interfering with another student's work. This is accomplished by the nature of the interior surface of the cover 11, and by three gaps 26, 27 and 28 between the cover 11 and the table 10. These three gaps 26, 27 and 28 act as acoustic resistors and have the same effect on the sound attenuation as a muffler in an automobile.

FIGURES 4 and 5 illustrate the combined desk and booth with the cover 11 in the closed position. In this position, the top 29 of the cover 11 can be used in the manner of a conventional desk. The lowermost edge 30 of the cover 11 butts against the front of the table 10 and prevents further rotation of the cover 11.

With specific reference to FIGURES 4 and 5, the cover 11 should be constructed in accordance with the following ratios in order to obtain the optimum acoustic damping properties when the cover 11 is in the open position and to obtain maximum usefulness when the cover 11 is in the closed position and is serving as a conventional desk top. The ratio of the length C of a back flange for the cover 11 to the depth F of the top 29 of the cover 11 should be between ¼ and ⅓; the ratio of the height G of the cover 11 to its depth F of the cover should be between ⅘ and ¾; the width H of a front flange on the cover 11 to the depth F of the cover should be between ¼ and ⅙; the ratio of the distance B between the back side of the table 10 and the shaft 15 to the distance A between the back flange of the cover 11 and the shaft 15 should be between ½ and ⅓; and the distance D between the top of the table 10 and the shaft 15 to the distance E between the top of the cover 11 and the shaft 15 should be between ½ and ⅓. These dimensions are quite important because, for example, if the gaps 26, 27 and 28 are made too large the booth will have poor damping qualities while if these gaps are made too small there will be mechanical interference between the cover 29 and the table 10. It is also quite important that these dimensions be followed so that the cover 11 will close with its top 29 at the proper inclination and will be open and provide proper access to the electronic equipment mounted on the top of the table 10. Further, the width H of the front flange on the cover 11 cannot be made too large otherwise it will prevent light from entering the booth and at the same time it cannot be made too small or it will not contain the sound generated within the booth.

The cover 11 should be made of a light and durable material such as Fiberglas, plastic, etc., and may be coated with an acoustic absorbing material but this is not necessary.

It will be apparent that many modifications and variations may be effected without departing from the scope of the novel concepts of the present invention.

I claim as my invention:

1. A convertible combined desk and sound absorbing booth, comprising, in combination: a table disposed substantially horizontally; a cover having a top and two sides rigidly secured to said top, said cover being hingedly secured to said table near the rear edge of said table and being tiltable as a unit between open and closed positions; said top extending at an acute angle substantially less than 90° to the upper surface of said table and extending thereover when said cover is in said open position, the interior of said top and sides and the upper surface of said table then jointly defining a wedge-shaped sound absorption cavity which opens near the front of said table; said top extending above and nearly parallel to the upper surface of said table when said cover is in said closed position, the outer surface of said top defining an unobstructed desk surface; a horizontal shaft connected at its ends to said sides of said tiltable cover and disposed within said cavity; means defining a notch on said table; and at least one support bar suspended from said shaft and releasably engaging said notch when said cover is in the open position.

2. A convertible combined desk and sound absorbing booth, comprising, in combination: a table disposed substantially horizontally; a cover having a top and two sides rigidly secured to said top, said cover being hingedly secured to said table near the rear edge of said table and being tiltable as a unit between open and closed positions; said top extending at an acute angle substantially less than 90° to the upper surface of said table and extending thereover when said cover is in said open position, the interior of said top and sides and the upper surface of said table then jointly defining a wedge-shaped sound absorption cavity which opens near the front of said table; said top extending above and nearly parallel to the upper surface of said table when said cover is in said closed position, the outer surface of said top defining an unobstructed desk surface; a horizontal shaft connected at its ends to said sides of said tiltable cover and disposed within said cavity; means defining a notch on said table; and at least one support bar suspended from said shaft and releasably engaging said notch when said cover is in the open position, said support bar and said notch-defining means being constructed to limit to an acute angle the maximum angle which said cover can be tilted in an opening direction.

3. A convertible combined desk and sound absorbing booth, comprising, in combination: a table disposed substantially horizontally; a cover having a top and two sides rigidly secured to said top, said cover being hingedly secured to said table near the rear edge of said table and being tiltable as a unit between open and closed positions; said top extending at an acute angle substantially less than 90° to the upper surface of said table and extending thereover when said cover is in said open position, the interior of said top and sides and the upper surface of said table then jointly defining a wedge-shaped sound absorption cavity which opens near the front of said table; said top extending above and nearly parallel to the upper surface of said table when said cover is in said closed position, the outer surface of said top defining an unobstructed desk surface; and a flat continuous flange lying in one plane and having an inverted U-shape defining a restricted opening to and exit from said cavity and secured at its outer periphery to the front edge of said top and to said sides, the interior of said flange being operative to reflect sound back into said wedge-shaped cavity.

4. A convertible sound absorbing booth, comprising, in combination: a table disposed substantially horizontally, said table having a rectangular upper surface defined by front, rear, and lateral edges; a cover having a rectangular top and two lateral sides rigidly secured to said top at lateral edges thereof, said cover being hingedly secured to said table near the rear edge of said table and being tiltable as a unit between open and closed positions; said top extending at a substantial acute angle to the upper surface of said table and being directed thereover when said cover is in said open position, the interior of said top and sides and the upper surface of said table then jointly defining a wedge-shaped sound absorption cavity which opens near the front of said table; said top extending above and nearly parallel to the upper surface of said table when said cover is in said closed position, the outer surface of said top defining a desk surface, each of said lateral sides of said cover extending along the entire length of said lateral edges of said table in both of said cover positions, a major portion of each of said lateral sides extending below the top surface of said table when said cover is in said closed position, and each of said lateral sides extending upwardly along the entire length of said lateral edges of said table when said cover is in said open position; a hinged shaft connected at its ends to said sides of said tiltable cover and disposed within said cavity; means defining a notch on said table; at least one support bar suspended from said shaft and releasably engaging said notch when said cover is in the open position; said support bar and said notch-defining means being constructed to limit the maximum angle which said cover can be tilted in an opening direction to an acute angle; each of said lateral sides of said cover extending away from the lateral edges of said top of said cover by a distance which is approximately equal to the length of the lateral edges of said table and which is approximately equal to the extent of said lateral sides at the lateral edges of said top; and a continuous flange having an inverted U-shape defining a restricted opening to and exit from said cavity, and secured at its outer periphery to the front edge of said top and to said sides.

References Cited in the file of this patent

UNITED STATES PATENTS

| | | |
|---|---|---|
| 818,910 | Owens | Apr. 24, 1906 |
| 903,565 | Hamer | Nov. 10, 1908 |
| 1,558,953 | Waldheim | Oct. 27, 1925 |
| 1,929,542 | Vandervoort | Oct. 10, 1933 |
| 2,221,510 | Dunham | Nov. 12, 1940 |
| 2,436,773 | Lambert | Feb. 24, 1948 |
| 2,769,211 | Hewitt | Nov. 6, 1956 |
| 2,804,933 | Imhof | Sept. 3, 1957 |
| 2,928,703 | Paulsen | Mar. 15, 1960 |
| 2,961,280 | Jentzen | Nov. 22, 1960 |